United States Patent Office 2,812,284
Patented Nov. 5, 1957

2,812,284

ORAL DETERGENT COMPOSITION AND DENTIFRICE COMPRISING SAME

Judson H. Sanders, Wyoming, Ohio, assignor to The Procter & Gamble Company, Cincinnati, Ohio, a corporation of Ohio No Drawing. Application April 15, 1953,
Serial No. 349,085

7 Claims. (Cl. 167—93)

This invention relates to toothpastes, powders, washes and similar toilet preparations for the teeth and mouth. More particularly, it describes preparations of this type which are new compositions of matter made by the use as basic ingredients of a new combination of dentifrice foaming and cleaning agents. This new blend of said agents is ideally suited for such use because of its complete freedom from toxicity or physiological effects and because, in the particular proportions in which the separate ingredients of the blend are employed, a unique combination of properties is imparted to the finished products in which they are used. Thus, the net effect achieved is that, with respect to each performance criterion, the blend of detergents always behaves as though it were made up solely of that ingredient which behaves most excellently, instead of merely showing some intermediate or weighted average of the performances characteristic of the two separate ingredients.

Soaps have been used in dentifrice preparations for many years as aids in deterging the teeth and mouth and in carrying away forign matter. More recently some synthetic organic detergents have been substituted for soap for this purpose. This change has brought about some improvement in the taste of such oral preparations, largely because these newer synthetic detergents are more effectively foamers and cleaners or, more to the point, they are effective at lower concentrations than soap. This improved efficiency is due partly to the fact that these synthetic detergents are not affected appreciably by calcium and magnesium ions as is soap. Another advantage of these detergents is that they are substantially neutral in most cases and hence the strong alkalinity produced by the use of soap can be avoided.

In spite of these advantages which have been produced by the substitution of synthetic organic foaming agents for soap, none of these new synthetic foaming agents which have thus far been proposed for use in oral preparations have been completely satisfactory for this purpose. Thus, all of these materials are still relatively harsh or strong in flavor compared to the other necessary ingredients of dentifrices. Largely because of these unpleasant detergent flavors, it has been customary in the past to add the essential flavoring oils in amounts which are in considerable excess of that required to impart a truly pleasant and refreshing taste to the product. This results in a very high level of total flavor which produces intense and burning taste sensations in the mouths of many persons instead of the feeling of refreshment which can be created by use of these essential oils at the proper concentration. Also, many synthetic foaming agents are worse than soap in the matter of flavor reactions with certain foods, such as citrus fruits and coffee. Apparently this effect is due to the adsorption of these agents on the mouth tissues during use and their resultant adverse flavor reactions with foods eaten within the period of effective adsorption. Frequently these flavor reactions are very unpleasant, particularly when the foods are acidic in nature as is the case with fruits and their juices, foods which are very commonly taken shortly after brushing the teeth.

In copending application Serial No. 311,303 now abandoned which was filed in the U. S. Patent Office by Wilfred S. Martin on September 24, 1952, there is disclosed a solution to the taste problems commonly encountered in dentifrices containing synthetic detergents. This solution involves the use of sulfonate salts of monoglycerides of medium-high molecular fatty acids as the active detergent.

It is an object of the present invention to obtain even greater speed of sudsing in foaming dentifrices without sacrificing any of the improved flavor qualities achieved by Martin. A further object of my invention is to provide a foaming dentifrice characterized by a combination of flavor mildness and sudsing speed superior to any previously available. Still further objects and advantages of the present invention will become apparent from the detailed description and explanation of the invention which follow.

I have found that the above objects are attained in dentifrices by employing as the active foaming agent a blend of the water-soluble sulfonate salts of monoglycerides of medium high molecular fatty acids with the water-soluble sulfate salts of medium-high molecular fatty alcohols, the weight ratio of the fatty alcohol sulfate to the fatty acid monoglyceride sulfonate being between about 0.2 to 1 and 0.5 to 1. I have discovered that within this range of proportions this blend of synthetic foaming agents at total concentrations in the product of from about 0.60% to 3% by weight performs synergistically in that, with respect to each individual quality, the performance of the blend always corresponds to that of whichever of the two individual detergents is superior and all of the weaknesses of each one separately are thereby eliminated. Thus, the mildness of flavor and absence of unpleasant flavor reactions with foods, which are characteristics of the monoglyceride sulfonate detergent, prevail in spite of the presence of the alkyl sulfate material while the sudsing pattern of the blend surprisingly combines the initial speed of the alkyl sulfate detergent with the copious, high-level production and stability of the monoglyceride sulfonate sudser. As a result, there can be obtained in accordance with this invention dentifrice products, which are not only truly mild-flavored and free of any taste defects but which also provide an optimum foaming and cleaning effect from the start to the finish of each period of use.

Each of the ingredients of the special detergent blend which I have found so effective for dentifrice use can be made by well known procedures. Methods of preparing the monoglyceride sulfonate ingredient are given by Clark in U. S. Patent 2,006,309 and also by Martin in his copending U. S. application Serial No. 311,303. Several methods for making the fatty alcohol sulfate ingredient are available. Representative procedures and some of the better techniques are disposed by Bertsch in U. S. Patents 2,264,737; 2,047,612 and 1,968,794.

In preparing each type of ingredient for my special detergent blend the source of the fatty raw material is selected in such as manner as to provide fatty hydrocarbon chain structures which are predominantly saturated and of medium-high molecular weight. By "medium high molecular" is meant containing from 10 to 18 carbon atoms per fatty chain. Thus, coconut and palm kernel oils or the acids, esters or alcohols derived therefrom are preferred starting materials. For optimum results, both ingredients of my special detergent should be prepared predominantly from raw materials possessing saturated fatty hydrocarbon chains predominantly of from 12 to 16 carbon atoms in length.

I have found that by employing the sodium salts of sulfated fatty alcohols of medium high molecular weight in the proportions of 1 part by weight to 2-5 parts by weight of sodium sulonate monoglycerides of medium-high molecular weight, 0.6% to 3% by weight of the resulting mixture can be incorporated into a dentifrice which is very mildly flavored with added essential oils without causing any unpleasant aftertaste of its own or changing the taste of foods which are eaten shortly after brushing with the said dentifrice. Moreover, in addition to this ideal performance from the point of view of flavor standards, the detergents of my particular blend complement each other perfectly in the matter of sudsing behavior. Thus, the suds level of a dentifrice containing a certain concentration of my combination detergent gives more foam at the start of sudsing than one containing the same concentration of pure monoglyceride sulfonate and more foam during the intermediate and final stages of use than one containing the same concentration of fatty alcohol sulfate. This superiority of my special detergent blend over the separate individual ingredients, as well as another of the better dentifrice detergents now in use, is demonstrated by the results below which were obtained from comparison tests of toothpastes which differed from one another only as to the character of the detergent.

The composition of each of the test dentifrices was made to correspond to the following general formula:

| Ingredient | Parts by Weight |
| --- | --- |
| Dicalcium phosphate abrasive | 42.83 |
| Water-Glycerin Elixir | 53.00 |
| Irish Moss Binder | 1.45 |
| Std. Mint Flavoring | 0.72 |
| Detergent | 2.00 |
| Total | 100.00 |

The detergent in paste K was sodium coconut monoglyceride sulfonate; in paste L it was sodium alkyl sulfate derived from coconut oil alcohols; and in paste M it was a blend of these two individual detergents in the proportion of 3 parts sodium coconut monoglyceride sulfonate to 1 part sodium alkyl sulfate derived from coconut oil alcohols. Both of the detergent products prepared for use in the above compositions were purified by extraction and recrystallization to remove inorganic salts and other impurities. The final products which were incorporated into the toothpastes contained about 90% active organic detergent in each case.

The pastes described above were compared, (1) for effect on the flavor of orange juice consumed after use of paste and (2) for sudsing characteristics. The particular comparison tests employed and the results obtained therefrom are described below.

(1) *Orange juice flavor effect test.*—A panel of 21 persons was checked for this taste reaction. Each person compared the taste of a standard brand of orange juice before and after using the test paste. Each person gave a numerical rating to the test paste of from 0 to 3 depending upon the amount of added bitterness imparted to the orange juice flavor after using the paste. The rating scale was standardized on the following basis:

0—no added bitterness
1—slight added bitterness
2—medium added bitterness
3—strong added bitterness Representative results from a number of these tests of the effect of the pastes on orange juice flavor are given below.

| Paste | No. of Subjects | No. Detecting Some Bitterness | Percent of Subjects Detecting Bitterness | Average Bitterness Score per Subject |
| --- | --- | --- | --- | --- |
| K | 20 | 11 | 55 | 0.70 |
| L | 21 | 20 | 95 | 1.76 |
| M | 21 | 11 | 52 | 0.76 |

In spite of the wide difference between straight monoglyceride sulfonate paste (K) and straight alkyl sulfate paste (L) in both incidence and severity of flavor reaction with orange juice as shown by the results above, the performance of paste M containing the 3 to 1 blend of these detergents is seen to be comparable in both of these respects to that of the straight monoglyceride sulfonate paste (K).

(2) *Sudsing characteristics.*—The sudsing performance of the several pastes was determined by a graduate shaking test. In this test 1.4 grams of the paste being evaluated were smeared into the bristles of a sawed-off toothbrush head which was then dropped into 100 cc. of Cincinnati tap water at 90° F. in a 250 cc. graduate. This water contained hardness equivalent to about 175 p. p. m. $CaCO_3$. The graduate was then covered and shaken by hand with a vigorous up and down motion. Readings of the foam volume thus produced were made after each 5 complete shakes. Results were as follows:

| No. of Shakes | Foam Volume (cc.) | | |
| --- | --- | --- | --- |
| | Paste K | Paste L | Paste M |
| 0 | 0 | 0 | 0 |
| 5 | 70 | 87 | 87 |
| 10 | 121 | 90 | 121 |
| 15 | 143 | 80 | 147 |
| 20 | 153 | 46 | 160 |
| 25 | 166 | 30 | 167 |
| 30 | 174 | 30 | 174 |
| 35 | 174 | 37 | 174 |
| 40 | 183 | 43 | 177 |

These tests were quite reproducible and substantially the same results were obtained by several different operators. The above results indicate that paste M, which contains the blend of detergents, produces foam with all the speed of the straight alkyl sulfate paste (L) but has combined therewith the continuous high level foam production and foam stability of the straight monoglyceride sulfonate paste (K). Thus, the level of suds production with paste M is better than that from paste K at the start and equal to that of K thereafter, while paste M equals paste L in foam production at the start but does not fall off and become unstable thereafter as L does.

In view of the results of the above comparisons, it is apparent that a toothpaste containing the mixture of detergents is superior overall to pastes made up with an equal amount of either one of the individual detergents by itself. Thus, paste M containing the blend has a definite advantage over the alkyl sulfate paste (L) both in freedom from taste reactions with citrus fruits and other foods and in overall sudsing performance. Against the straight monoglyceride sulfonate paste (K), the mixed detergent paste (M) shows up about equal on flavor effects but definitely superior on overall sudsing behavior due to its quicker pickup in initial foam production. These same advantages of combining the two detergents in one product are found at all concentrations of the blend from 0.6 to 3.0% provided the composition of the blend lies between about 17-33% alkyl sulfate and 83-67% monoglyceride sulfonates.

Although the advantage of my particular detergent blend over the straight sodium coconut monoglyceride sulfonate alone resides chiefly in this one point of increased sudsing speed, it is nonetheless a very valuable and desirable improvement and it is very significant to note that it was achieved without loss or reduction in the other very desirable characteristics which characterized sodium coconut monoglyceride sulfonates alone and which made these materials almost ideal for use in dentifrices, such as mildness in flavor, freedom from taste reactions and stability or inertness to other ingredients.

Since my particular detergent blend is neutral, nontoxic and unaffected by calcium, magnesium or other metallic ions and inorganic salts, there are no special problems involved in selecting companion ingredients for use therewith. However, the following examples illustrate typical compositions which may be prepared in accordance with the present invention.

*Example I*

A typical toothpaste formulated in accordance with the present invention is the following:

| Ingredient | Parts by Weight |
| --- | --- |
| Dicalcium phosphate | 40.88 |
| Sodium monoglyceride sulfonate | 2.30 |
| Sodium alkyl sulfate | 0.70 |
| Water-glycerine elixir | 53.00 |
| Saccharine | 0.12 |
| Irish Moss Extract | 2.00 |
| Flavor (Mint) | 1.00 |
| Total | 100.00 |

*Example II*

Another composition for a toothpaste which makes full use of the advantages of the present invention is the following:

| Ingredient | Parts by Weight |
| --- | --- |
| Dicalcium phosphate | 43.155 |
| Sodium Monoglyceride Sulfonate | 0.750 |
| Sodium alkyl sulfate | 0.375 |
| Water-glycerine elixir | 53.000 |
| Irish Moss Extract | 1.500 |
| Salt and Sweetener | 0.370 |
| Flavoring | 0.850 |
| Total | 100.000 |

Both of the pastes of Examples I and II above are products of exceptionally high quality and are characterized by mild refreshing flavor, ideal sudsing behavior and freedom from interference with the flavor of other materials which may contact mouth surfaces which have been cleaned therewith. Moreover, these products are very stable and may be stored for periods of a year or more even under adverse temperature conditions without loss of these desirable characteristics. The same advantages are found when potassium or other alkali metal salts are substituted for the sodium salts in the above examples. Ammonium and substituted ammonium salts could also be used.

The composition of Example II is extremely mild and pleasant to taste and especially well liked by children and others with sensitive mouth tissues. In spite of the fact that this product contains less added flavoring than most popular brands of toothpaste now on the market, its overall superiority has been consistently demonstrated in several home use tests in blind competition with the two best selling competitive products. These home use tests are made by giving a sample of the product of Example II and a sample of the competing commercial product, each packaged in plain white tubes with letter code identification only, to each person surveyed. All persons surveyed in these home use tests still possessed their own natural teeth and claimed to be regular users of commercial dentifrices.

The results of the largest of the above tests with each competitive product are given below:

TEST 1—EXAMPLE II PASTE VS. BEST SELLER NO. 1

Our of nearly 700 people surveyed 58% of all those expressing a preference favored the composition of Example II overall (56% of the adults and 61% of the children). On the basis of foaming qualities alone, 57% of the adults expressing a choice voted for the Example II paste. On the basis of flavor alone the product of this invention was perferred by 60% of both the children and adults expressing a choice.

TEST 2—EXAMPLE II PASTE VS. BEST SELLER NO. 2

Out of nearly 700 people surveyed 58% of all those making a definite overall choice voted for the composition of Example II, (54% of the adults and 66% of the children). On the basis of foaming qualities alone, 57% of the adults expressing a choice voted for the Example II product. On the basis of flavor alone, the figures for the product of this invention were 59% of the adults and 72% of the children.

It will be apparent that my invention is susceptible to almost unlimited variations as regards choice of other ingredients to be used with my blend of detergents in forming the various oral preparations. Thus, any of the other well known polishing compounds such as calcium carbonate, magnesium hydroxide, calcium sulfate, aluminas, tricalcium phosphate and other calcium phosphates may be substituted for the dicalcium phosphate shown in the above examples. Starch, natural and synthetic gums, and many other binders may be used in place of Irish Moss and similar substitutions as are known in the art of dentifrice making may be effected throughout the above formulae. Oil of wintergreen, oil of cloves, oil of cinnamon and any other essential oils or flavorings suitable for use in dentifrices may be used in place of the mint flavoring shown in the above examples and in all cases a reduced amount will be found necessary to produce a given flavor effect, and a cleaner, fresher tasting paste can be produced as a result of this fact. In addition to the indicated substitutions, many additional materials may also be incorporated into the dentifrice for specific purposes, such as germicides or therapeutic agents, special adsorbents or coloring agents, etc. All such variations are intended to be included within the scope of the appended claims.

Having thus described my invention, what I claim and desire to secure by Letters Patent is:

1. A dentifrice having a superior initial sudsing speed and improved flavor qualities and containing between about 0.6% and 3.0% by weight of a mixture of water-soluble salts of fatty acid monoglyceride sulfonates containing from 10 to 18 carbon atoms per fatty chain and water-soluble salts of fatty alcohol sulfates containing from 10 to 18 carbon atoms per fatty chain in which the weight ratio of the salts of fatty alcohol sulfates to the salts of fatty acid monoglyceride sulfonates is between about 0.2 and 0.5.

2. A dentifrice having a superior initial sudsing speed and improved flavor qualities and containing between about 0.6% and 3.0% of a mixture of synthetic organic detergents, said mixture being composed of from about 17 to 33% by weight of water-soluble salts of fatty alcohol sulfates containing from 10 to 18 carbon atoms per fatty chain and of from about 83 to 67% by weight of water-soluble salts of fatty acid monoglyceride sulfonates containing from 10 to 18 carbon atoms per fatty chain.

3. A toothpaste having a superior initial sudsing speed and improved flavor qualities and containing as the active foaming agent about 0.6 to 3% of a blend of the sodium salts of fatty alcohol sulfates containing from 10 to 18 carbon atoms per fatty chain and the sodium salts of fatty acid monoglyceride sulfonates containing from 10 to 18 carbon atoms per fatty chain in the proportions of 0.2 to 0.5 part by weight of the fatty alcohol sulfates per part of the monoglyceride sulfonates.

4. A dental preparation having a superior initial sudsing speed and improved flavor qualities and comprising a polishing agent, a flavoring material and between about 0.6% and 3.0% of a mixed detergent containing 2 to 5 parts by weight of sodium monoglyceride sulfonates of predominantly saturated fatty acids of from 10 to 18 carbon atoms in length per part of sodium salts of predominantly saturated sulfated fatty alcohols of from 10 to 18 carbon atoms in length.

5. A toothpaste having a superior initial sudsing speed and improved flavor qualities and comprising about 40 to 60 parts by weight liquid vehicle, about 1 to 2 parts by weight Irish Moss extract, about 30 to 50 parts by weight of a calcium phosphate polishing agent, about 0.5 to 1.2 parts by weight flavoring material, and about 1 to 2 parts by weight of a detergent blend composed of about 67 to 83% by weight of sodium monoglyceride sulfonates of predominantly saturated fatty acids of from 10 to 18 carbon atoms in length and about 33 to 17% by weight of sodium salts of predominantly saturated fatty alcohols of from 10 to 18 carbon atoms in length.

6. A mildly flavored but copiously foaming toothpaste containing as the active foaming agent about 1 to 2 parts by weight of a detergent blend composed of about 67 to 83% by weight of sodium monoglyceride sulfonates of predominantly saturated fatty acids of from 10 to 18 carbon atoms in length and about 33 to 17% by weight of sodium salts of predominantly saturated sulfated fatty alcohols of from 10 to 18 carbon atoms in length and about 0.5 to 1.2 parts by weight of flavoring material.

7. A detergent blend especially suitable for use in dentifrices to promote superior initial sudsing speed and impart mild flavor characteristics the active portion of which is composed of from about 67 to 83% by weight of sodium monoglyceride sulfonates of predominantly saturated fatty acids of from 10 to 18 carbon atoms in length and about 33 to 17% by weight of sodium salts of predominantly saturated sulfated fatty alcohols of from 10 to 18 carbon atoms in length.

References Cited in the file of this patent

UNITED STATES PATENTS

| | | |
|---|---|---|
| 2,006,309 | Clark | June 25, 1935 |
| 2,264,737 | Bertsch | Dec. 2, 1941 |
| 2,519,665 | Klippert | Aug. 22, 1950 |
| 2,556,959 | Connelly | June 12, 1951 |

FOREIGN PATENTS

| | | |
|---|---|---|
| 644,339 | Great Britain | Oct. 11, 1950 |

UNITED STATES PATENT OFFICE
CERTIFICATE OF CORRECTION

Patent No. 2,812,284

November 5, 1957

Judson H. Sanders

It is hereby certified that error appears in the above numbered patent requiring correction and that the said Letters Patent should read as corrected below.

In the grant, line 12, name of assignee, for "The Proctor & Gamble Company," read -- The Procter & Gamble Company,--; in the printed specification, column 1, line 40, for "effectively" read -- effective --; column 2, line 59, for "as manner" read -- a manner --; column 7, line 9, after "saturated" insert -- sulfated --.

Signed and sealed this 7th day of January 1958.

(SEAL)
Attest:

KARL H. AXLINE
Attesting Officer

ROBERT C. WATSON
Commissioner of Patents